(12) United States Patent
Stier et al.

(10) Patent No.: US 11,932,943 B2
(45) Date of Patent: Mar. 19, 2024

(54) PRODUCTION OF A STRUCTURE USING A COLD SPRAYING METHOD

(71) Applicant: Siemens Aktiengesellschaft, Munich (DE)

(72) Inventors: Oliver Stier, Berlin (DE); Ursus Krüger, Berlin (DE); Jakob Schneck, Berlin (DE); Uwe Pyritz, Berlin (DE); Axel Arndt, Berlin (DE); Jens Dahl Jensen, Berlin (DE); Karsten Brach, Berlin (DE); Hartmut Rauch, Berlin (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 62 days.

(21) Appl. No.: 17/632,824

(22) PCT Filed: Jun. 23, 2020

(86) PCT No.: PCT/EP2020/067508
§ 371 (c)(1),
(2) Date: Feb. 4, 2022

(87) PCT Pub. No.: WO2021/023430
PCT Pub. Date: Feb. 11, 2021

(65) Prior Publication Data
US 2022/0275517 A1    Sep. 1, 2022

(30) Foreign Application Priority Data
Aug. 5, 2019 (EP) .................................. 19189951

(51) Int. Cl.
*C23C 24/04* (2006.01)
*H02K 15/04* (2006.01)

(52) U.S. Cl.
CPC ......... *C23C 24/04* (2013.01); *H02K 15/0407* (2013.01)

(58) Field of Classification Search
None
See application file for complete search history.

(56) References Cited

U.S. PATENT DOCUMENTS

| 5,302,414 A | 4/1994 | Alkhimov et al. ........... 427/192 |
| 2010/0151124 A1 | 6/2010 | Xue et al. .................... 427/185 |

(Continued)

FOREIGN PATENT DOCUMENTS

| CN | 108476588 A | 8/2018 | ............. C23C 24/04 |
| DE | 102006029071 B3 | 10/2007 | ............... C23C 4/02 |

(Continued)

OTHER PUBLICATIONS

Russian Office Action, Application No. 2022102515/05, 13 pages, dated Jul. 20, 2022.

(Continued)

*Primary Examiner* — Michael P. Rodriguez
(74) *Attorney, Agent, or Firm* — Slayden Grubert Beard PLLC

(57) ABSTRACT

Various embodiments include a method for producing a structure with a cold gas spraying method comprising: providing a carrier with a carrier surface, to which the structure is to be attached by the cold gas spraying method by following a travel path; and providing an element with an element surface different from the carrier surface. The element is arranged in the travel path and/or the travel path is specified such that intersections of the travel path and/or interruptions of the structure are arranged on the element surface.

9 Claims, 2 Drawing Sheets

(56) References Cited

U.S. PATENT DOCUMENTS

| | | | |
|---|---|---|---|
| 2012/0009336 A1* | 1/2012 | Jones | C23C 24/04 |
| | | | 427/126.1 |
| 2014/0035423 A1 | 2/2014 | Veronesi et al. | 310/194 |
| 2015/0076951 A1 | 3/2015 | Lynch et al. | 310/195 |
| 2015/0182987 A1* | 7/2015 | Schillinger | B05B 13/0207 |
| | | | 118/301 |
| 2015/0197858 A1* | 7/2015 | Corbeil | C23C 4/01 |
| | | | 118/301 |
| 2017/0364076 A1* | 12/2017 | Keshmiri | G05B 19/0426 |
| 2018/0274104 A1* | 9/2018 | Reznik | C23C 24/04 |
| 2018/0304560 A1 | 10/2018 | Eichenhofer | B29C 70/52 |
| 2018/0332711 A1 | 11/2018 | Bisges et al. | |

FOREIGN PATENT DOCUMENTS

| | | | |
|---|---|---|---|
| RU | 2041287 C1 | 8/1995 | B32B 15/04 |
| WO | 2016 048191 | 3/2016 | C23C 24/04 |
| WO | 2017 071794 | 5/2017 | B29C 31/00 |

OTHER PUBLICATIONS

Kosarev Vladimir F et al: "Recently Patented Facilities and Applications in Cold Spray Engineering", Recent Patents in Engineering, Bentham Science Publishers Ltd., NL, vol. 1, pp. 35-42, XP007915818, ISSN: 1872-2121; section "Fields of Applications"; pp. 38, right column—pp. 40, left column, 2007.

Search Report for EP Application No. 19189951.7, 6 pages, dated Mar. 6, 2020.

Chinese Office Action, Application No. 202080054878.7, 7 pages, dated Oct. 8, 2022.

\* cited by examiner

PRODUCTION OF A STRUCTURE USING A COLD SPRAYING METHOD

CROSS-REFERENCE TO RELATED APPLICATIONS

This application is a U.S. National Stage Application of International Application No. PCT/EP2020/067508 filed Jun. 23, 2020, which designates the United States of America, and claims priority to EP Application No. 19189951.7 filed Aug. 5, 2019, the contents of which are hereby incorporated by reference in their entirety.

TECHNICAL FIELD

The present disclosure relates to fabrication techniques. Various embodiments of the teachings herein include methods and/or systems for cold spraying.

BACKGROUND

When constructing structures by means of cold gas spraying, in particular three-dimensional structures, in some cases there are intersections of the travel path outside of the functional geometry. This would lead to undesirable excess elevations of the structure and carries the risk of collisions with the molding tool. If complex structures are to be manufactured, it is not always possible to avoid intersections. Previously, these had to take place in the free space, which is not always possible, as a constant travel speed is ideal for the geometric mapping of cold-gas-sprayed structures and the geometry of the structure is often a limiting factor.

SUMMARY

The teachings of the present disclosure includes methods which make it possible to produce complex structures in an efficient manner by means of a cold gas spraying method. For example, some embodiments of the teachings herein include a method for producing a structure (1) by means of a cold gas spraying method, comprising: providing a carrier (5) with a carrier surface (50), to which the structure (1) is attached by means of the cold gas spraying method by following a travel path (10), and providing an element (7) with an element surface (70) that is different from the carrier surface (50), wherein the element (7) is arranged in the travel path (10) and/or the travel path (10) is specified such that intersections (X10) of the travel path (10) and/or interruptions (I10) of the structure (1) are arranged on the element surface (70).

In some embodiments, the element surface (70) has a lower coatability compared to the carrier surface (50).

In some embodiments, the element surface (70) is embodied as an absorber for particles of the cold gas spraying method.

In some embodiments, the element surface (70) is embodied such that particles of the cold gas spraying method penetrate into the element surface (70).

In some embodiments, the element surface (70) features plastic, in particular fiber-filled plastic.

In some embodiments, the travel path (10) is chosen such that the element surface (70) of the element (7) has an optimal area.

In some embodiments, the travel path (10) is specified such that the intersections (X10) of the travel path (10) and/or the interruptions of the structure (1) are arranged on the element surface (70) of a single element (7).

In some embodiments, the method further includes producing the structure (1) by means of the cold gas spraying method by following the travel path (10).

In some embodiments, the element (1) is removed after producing the structure (1).

In some embodiments, the structure (1) is a winding head for an electric machine.

As another example, some embodiments include an element (7) for use in a method as described herein.

BRIEF DESCRIPTION OF THE DRAWINGS

The teachings herein are explained in more detail below on the basis of the exemplary embodiments shown in the figures, in which.

DETAILED DESCRIPTION

Figure 1:
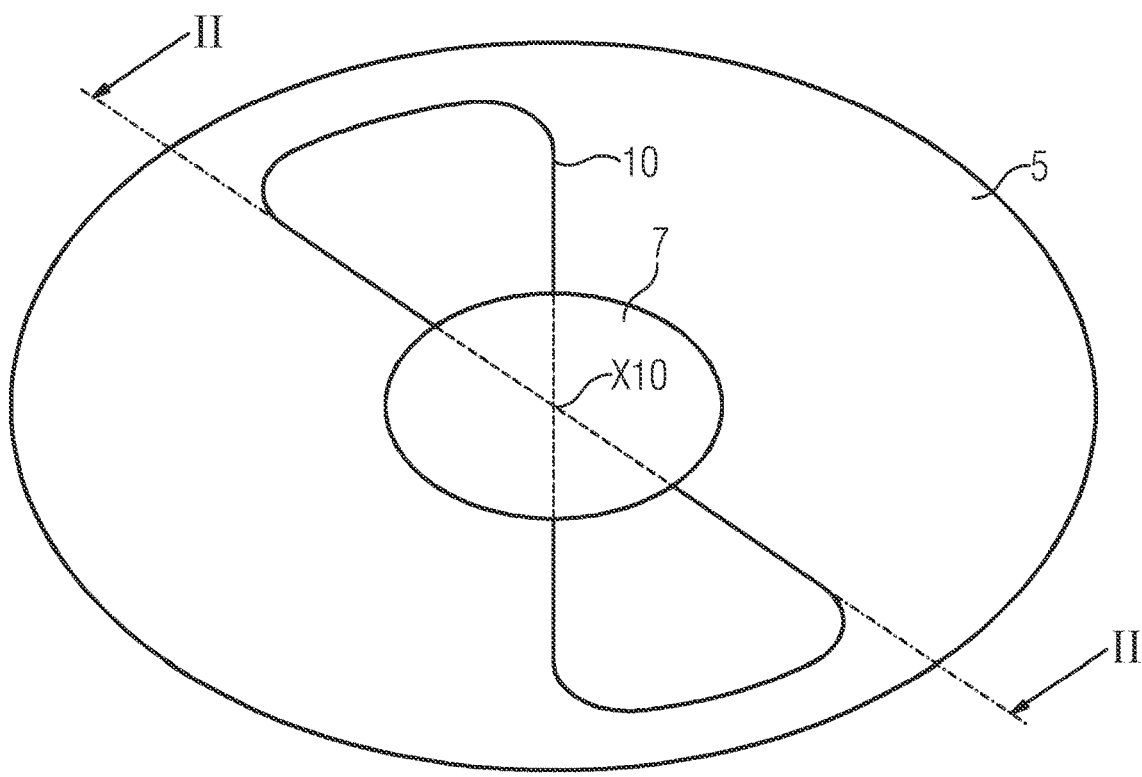
FIG. 1 schematically shows a travel path.

Various embodiments of the teachings herein include a method for producing a structure by means of a cold gas spraying method comprising: providing a carrier with a carrier surface, to which the structure is attached by means of the cold gas spraying method by following a travel path, and providing an element with an element surface that is different from the carrier surface, wherein the element is arranged in the travel path and/or the travel path is specified such that intersections of the travel path and/or interruptions of the structure are arranged on the element surface.

The travel path is the path that the cold gas particle jet follows on the carrier and along which the structure is formed on the carrier. In other words, the travel path is followed using the cold gas particle jet. The cold gas spraying tool is therefore moved such that the cold gas particle jet reproduces the travel path as exactly as possible.

In some embodiments, the carrier surface is optimized with regard to a coating or a construction of the structure by way of the cold gas spraying method. In some embodiments, the element or the element surface thereof is characterized in that the material to be applied does not remain adhering to the surface, and yet it withstands the material bombardment by the particle jet at least for a time. In this context, intersections comprise crossings of the travel path. Intersections may likewise include complete and/or partial overlappings of the travel path, if this is embodied as a strip structure and therefore has a width.

In some embodiments, the method makes it also possible to manufacture complex structures, the production of which requires many intersections or intersections of the travel path, without adapting the travel path, as at the points of the travel path at which there would be an undesirable increased application of material, only a heavily reduced application of material takes place, or none at all. This is realized by the element surface that is embodied as different from the carrier surface.

In critical regions which have to be protected from the particle jet, or intersections or other excess elevations which entail an excessive application of material, it is possible to protect by means of an element or a plurality of elements. In the case used as an example, copper is used as material to be applied and an epoxy resin hard tissue plate filled with glass fibers is used as a "sacrificial plate". Furthermore, the element can be arranged such that critical structures, which under no circumstances are permitted to be exposed to the particle jet, are covered by the element and are protected thereby.

In some embodiments, the travel path can therefore be specified and/or the element can be arranged such that interruptions of the structure and/or intersections of the travel path are arranged on the element surface of the element. In addition or as an alternative to the choice of the position of one or more elements, the travel path can also be chosen or optimized such that intersections and/or interruptions of the structure are arranged on the element in a repeated manner. As the element surface only allows reduced coating or no coating by the particle jet, it is possible for interruptions, for example partial structures that are electrically isolated from one another, to be realized in a simple manner.

In some embodiments, the element surface has a lower coatability compared to the carrier surface. In this context, the element surface is preferably embodied such that a coating by means of the cold gas spraying method as much as possible does not take place, or is considerably reduced.

In some embodiments, the element surface is embodied as an absorber for particles of the cold gas spraying method. This has the advantage that the particles therefore cannot be deposited on the surface of the element, or can only do so to a limited extent. Plastics may be used as such an absorber, for example.

In some embodiments, the element surface is embodied such that particles of the cold gas spraying method penetrate into the element surface. This may be achieved by an element surface, which does not enable a kinetic deformation of the cold gas particles, because it is soft, ductile and/or elastic enough to bend. Here, in addition to plastic materials, it is also possible for elastic materials such as rubber materials and composites to be used. Accordingly, the particles penetrate into the surface instead of being deposited onto it, and it is therefore possible for no coating, and accordingly no application of material—which would be undesirable at these points—to be formed.

In some embodiments, the element surface features plastic. In particular, fiber-filled plastic has proven to be useful in this context. The element may consist entirely of plastic, in particular of fiber-filled plastic, or may have a plastic layer on the (element) surface. Element surfaces made of plastic tend to be reasonably priced and readily available and can be easily adapted to the application or can even be custom-made directly for the application (for example, by 3D printing).

In some embodiments, the travel path is chosen such that the element surface of the element has an optimal area. The area may be optimal, for example, if its area is minimal and its extent in one of its dimensions has been optimized. This is dependent upon the structure to be manufactured and, depending on the application, a particularly evenly distributed area, a particularly small area and/or an area with a certain shape. The arrangement and the choice of the area may be subject to further optimization criteria and/or general conditions.

In some embodiments, the travel path is chosen such that the intersections of the travel path are arranged on the element surface of a single element. In some embodiments, the element may also be arranged or embodied such that all intersections of the travel path lie on the element. In some embodiments, the travel path is specified such that interruptions of the structure are arranged within the element surface of a single element. This has the advantage that only one element has to be arranged and, accordingly, less effective area has to be provided for the element.

In some embodiments, the method comprises producing the structure by means of cold gas spraying by following the travel path. The particle jet follows the travel path, wherein the structure is deposited on the carrier surface and therefore the structure is formed layer by layer. If the particle jet moves over the element surface, then the particles are not deposited thereon, but rather they penetrate into it, for example, whereby the element may lie in the travel path multiple times without there being an undesirably high application of material.

In some embodiments, the element is removed after producing the structure. In this context, the element is in particular removed from the structure, so that the structure has no residues of the element. As an alternative and/or in addition, the element or parts thereof may also remain in the structure. In this context, the element or parts thereof may have a supporting effect for the structure. Thus, the element can be used in a flexible manner during production of the structure and may assume further functions.

In some embodiments, the structure is a winding head for an electric machine. Winding heads or even turning regions of the electrical windings of electric machines, due to the minimum bending radii to be observed of the copper conductors usually used, have a limit for the minimum size, which cannot be made any smaller. By constructing the winding heads as a structure in accordance with the present method, bending radii no longer have to be taken into consideration and the structural space used for the winding heads can be made considerably smaller.

FIG. 1 schematically shows a travel path 10 of a structure 1, which is not shown here or has not yet been constructed. In this context, the travel path 10 is located on a carrier 5, in the center of which an element 7 is arranged. The travel path 10 has dashed regions, which are arranged on the element 7. The travel path 10 crosses itself at an intersection X10. At the intersection X10, an undesirable application of material would take place, which could lead to a collision with the cold gas spraying tool. According to the invention, the element 7 therefore has an element surface 70, which is different from an element surface 50 of the carrier 5. This is explained in further detail in FIG. 2, for which a sectional axis II-II is drawn in FIG. 1.

Figure 2:
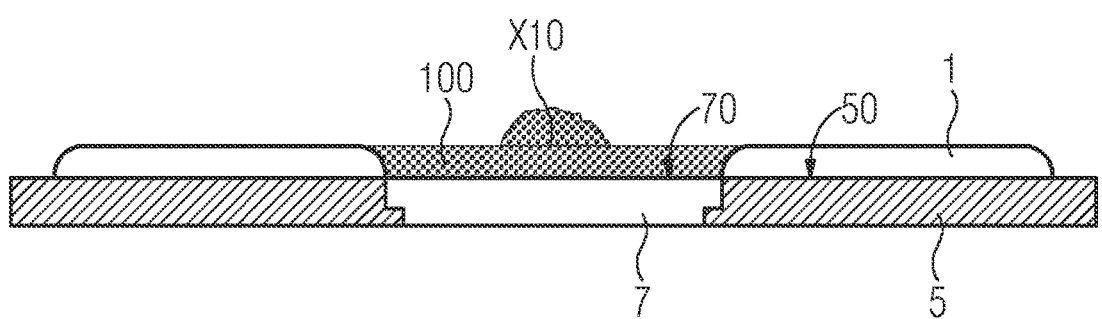
FIG. 2 shows a cross-section through a carrier and an element.

FIG. 2 shows a section along the sectional axis II-II through the carrier 5 shown in FIG. 1 and the element 7. In this context, the representation is not to scale, in order to clarify the effects that occur. By following the travel path 10, the structure 1 develops on the carrier. In this case, the structure 1 has already been produced and accordingly is shown in full. An undesirable application of material 100, which is indicated in a dotted manner, can likewise be seen.

At the intersection X10, the application of material is excessively high, which could lead to a collision with the cold gas spraying tool. As the element surface 70 is embodied differently from the carrier surface 50, however, no application of material takes place at the element surface 70. Thus, it is possible to travel over the intersection X10 multiple times without there being an undesirable application of material. Preferably, the element 7 may be embodied as an epoxy resin plate. In this case, the element 7 is embodied as a disc element and can be inserted into a recess in the carrier 5, so that a flat area is formed which consists of the element surface 70 and the carrier surface 50.

Figure 3:
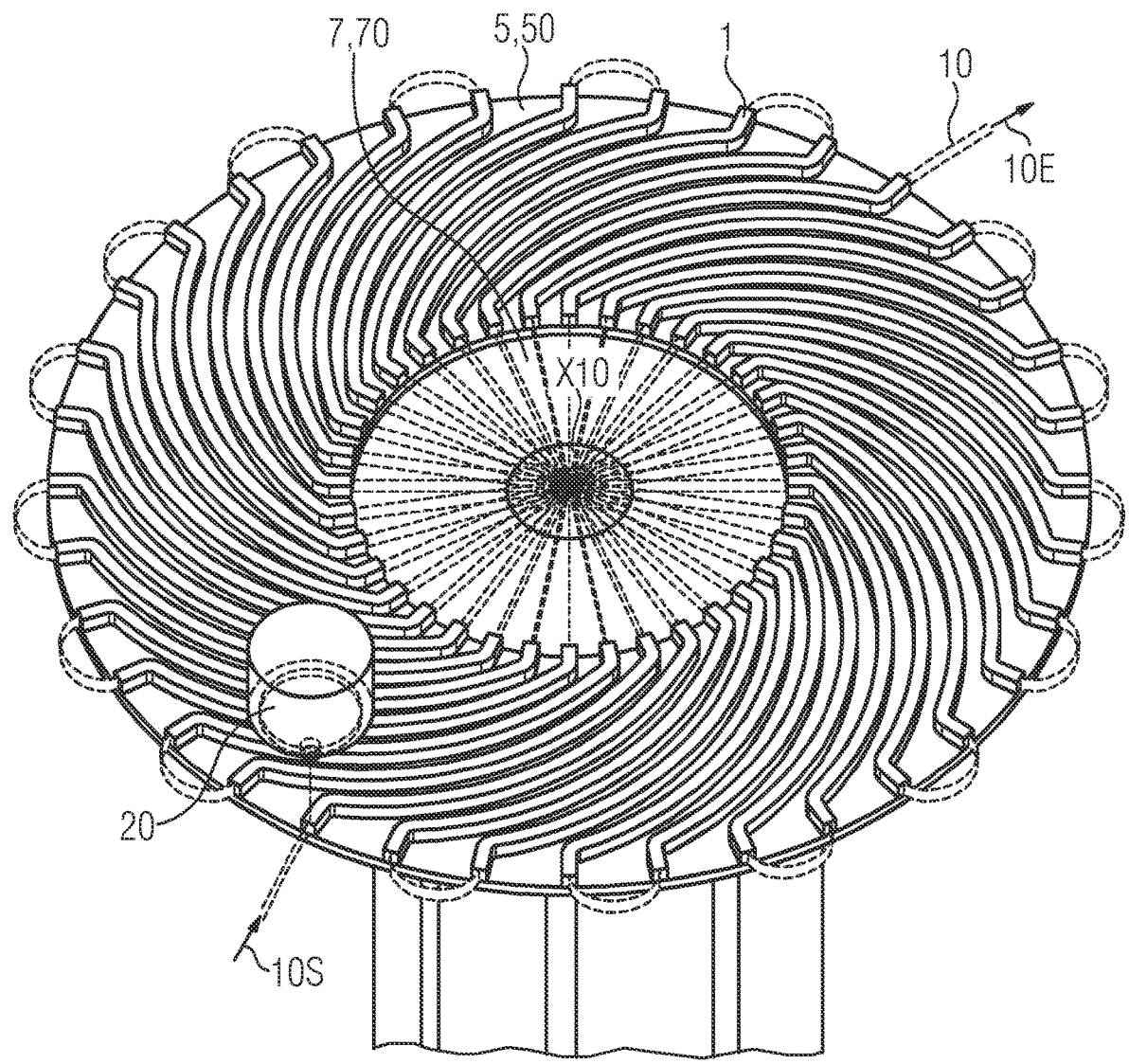
FIG. 3 shows an example of a complex structure.

FIG. 3 shows an example of a complex structure 1, which in this case is embodied as a winding head for an electric machine. In this context, the windings of the winding head are constructed as structure 1 and can be constructed, for example, such that they are not electrically connected to one another, and, for example, are then in electrical contact with the motor windings. A nozzle 20, which is embodied for the application of the structure 1 by means of a cold gas spraying method, is indicated schematically.

In this context, the structure 1 is arranged on a carrier 5 or the carrier surface 50 thereof. The dashed parts of a travel path 10 indicate that the structure 1 can be followed with a single movement without interruption of the particle jet and without discontinuing. To this end, the travel path has a start 10S and an end 10E. The nozzle 20 follows the travel path 10 from the start 10S to the end 10E in one movement. An element 7 is arranged in the center here, wherein the element surface 70 includes part of the travel path. Intersections X10 of the travel path are likewise indicated and, in accordance with one embodiment of the present invention, lie in the center of the element surface 70. Due to the element 7, or the element surface 70 thereof, no significant application of material takes place on the element surface 70 and the travel path 10 may cross the element multiple times. This considerably improves the ability to produce complex structures and expands the degrees of freedom that are available during the construction of structures.

In some embodiments, there is a method for producing a structure 1 by means of a cold gas spraying method. In order to produce complex structures 1 efficiently by means of cold gas spraying, the method may include: providing a carrier 5 with a carrier surface 50, to which the structure 1 is attached by means of the cold gas spraying method by following a travel path 10, and providing an element 7 with an element surface 70 that is different from the carrier surface 50, wherein the element 7 is arranged in the travel path 10 and/or the travel path 10 is specified such that intersections X10 of the travel path 10 are arranged on the element surface 70. The teachings herein furthermore relates to an element 7 for use with the methods.

What is claimed is:

1. A method for producing a structure with a cold gas spraying method, the method comprising:
    providing a carrier with a carrier surface, to which the structure is to be attached by the cold gas spraying method by following a travel path; and
    providing an element with an element surface different from the carrier surface;
    wherein the element is arranged in the travel path and/or the travel path is specified such that intersections of the travel path and/or interruptions of the structure are arranged on the element surface; and
    wherein the element surface comprises a fiber-filled plastic.

2. The method as claimed in claim 1, wherein the element surface has a lower coatability compared to the carrier surface.

3. The method as claimed in claim 1, wherein the element surface comprises an absorber for particles of the cold gas spraying method.

4. The method as claimed in claim 1, wherein particles of the cold gas spraying method penetrate into the element surface.

5. The method as claimed in claim 1, wherein the travel path is chosen such that the element surface of the element is minimized and at least one of its dimensions has been optimized.

6. The method as claimed in claim 1, wherein the travel path is specified such that the intersections of the travel path and/or the interruptions of the structure are arranged on the element surface of a single element.

7. The method as claimed in claim 1, further comprising producing the structure using the cold gas spraying method by following the travel path.

8. The method as claimed in claim 1, further comprising removing the element after producing the structure.

9. The method as claimed in claim 1, wherein the structure is a winding head for an electric machine.

\* \* \* \* \*